US012548489B2

(12) United States Patent
Sohn

(10) Patent No.: US 12,548,489 B2
(45) Date of Patent: Feb. 10, 2026

(54) DISPLAY DEVICE INCLUDING A PLURALITY OF DISPLAY PANEL DRIVERS AND METHOD OF DRIVING THE SAME

(71) Applicant: SAMSUNG DISPLAY CO., LTD., Yongin-si (KR)

(72) Inventor: Young Soo Sohn, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/830,768

(22) Filed: Sep. 11, 2024

(65) Prior Publication Data

US 2025/0279025 A1 Sep. 4, 2025

(30) Foreign Application Priority Data

Feb. 29, 2024 (KR) ........................ 10-2024-0029724

(51) Int. Cl.
*G09G 3/20* (2006.01)

(52) U.S. Cl.
CPC ... *G09G 3/2074* (2013.01); *G09G 2310/0267* (2013.01); *G09G 2310/027* (2013.01); *G09G 2320/02* (2013.01)

(58) Field of Classification Search
CPC .................................................... G09G 3/2074
See application file for complete search history.

(56) References Cited

U.S. PATENT DOCUMENTS

| | | | | |
|---|---|---|---|---|
| 9,858,897 B2 | 1/2018 | Han et al. | | |
| 2012/0140160 A1* | 6/2012 | Han | G02F 1/13336 | 349/144 |
| 2015/0243201 A1* | 8/2015 | Chung | G09G 3/3225 | 345/77 |
| 2022/0108667 A1 | 4/2022 | Park et al. | | |

FOREIGN PATENT DOCUMENTS

| | | | |
|---|---|---|---|
| KR | 10-2016-0065556 A | 6/2016 | |
| KR | 10-2022-0046464 A | 4/2022 | |
| KR | 10-2566579 B1 * | 8/2023 | G09G 3/3233 |

* cited by examiner

*Primary Examiner* — Matthew A Eason
*Assistant Examiner* — Scott D Au
(74) *Attorney, Agent, or Firm* — F. CHAU & ASSOCIATES, LLC

(57) ABSTRACT

A display device includes: a display panel including sub-pixels, a first area, and a second area, wherein the sub-pixels are disposed in the first area and the second area; a first display panel driver configured to drive the first area, to accumulate stress for the first area to generate a first stress accumulation value, and to compensate for input image data that is for the first area based on the first stress accumulation value; and a second display panel driver configured to drive the second area, to accumulate stress for the second area to generate a second stress accumulation value, and to compensate for input image data that is for the second area based on the second stress accumulation value, wherein the first display panel driver and the second display panel driver are synchronized with each other through an accumulation synchronization signal to accumulate the stress.

19 Claims, 15 Drawing Sheets

DISPLAY DEVICE INCLUDING A PLURALITY OF DISPLAY PANEL DRIVERS AND METHOD OF DRIVING THE SAME

CROSS-REFERENCE TO RELATED APPLICATION

The application claims priority under 35 U.S.C. § 119 (a) to Korean Patent Application No. 10-2024-0029724, filed on Feb. 29, 2024, the disclosure of which is incorporated by reference herein in its entirety.

TECHNICAL FIELD

The present invention relates to a display device and a method of driving the same, and more specifically, to a display device including a plurality of display panel drivers and a method of driving the same.

DISCUSSION OF THE RELATED ART

As information technology develops, the usefulness of a display device as a connection medium between a user and information increases. In response to this, display devices such as a liquid crystal display device and an organic light emitting display device are continuously under development.

Recently, the use of display devices with high resolution has been increasing. In the case of display devices with high resolution, the amount of calculations being performed may be excessively large for a single driver integrated circuit (IC) that drives the entire display panel.

SUMMARY

According to embodiments of the present invention, a display device includes: a display panel including sub-pixels, a first area, and a second area, wherein the sub-pixels are disposed in the first area and the second area; a first display panel driver configured to drive the first area, to accumulate stress for the first area to generate a first stress accumulation value, and to compensate for input image data that is for the first area based on the first stress accumulation value; and a second display panel driver configured to drive the second area, to accumulate stress for the second area to generate a second stress accumulation value, and to compensate for input image data that is for the second area based on the second stress accumulation value, wherein the first display panel driver and the second display panel driver are synchronized with each other through an accumulation synchronization signal to accumulate the stress.

In embodiments of the present invention, the display device further includes: a gate driver configured to provide gate signals to the sub-pixels, wherein the first display panel driver controls the gate driver.

In embodiments of the present invention, the first display panel driver provides the accumulation synchronization signal to the second display panel driver.

In embodiments of the present invention, the first display panel driver provides a data enable synchronization signal, which has an activation level, to the second display panel driver during an active section, and wherein the accumulation synchronization signal is included in the data enable synchronization signal.

In embodiments of the present invention, the accumulation synchronization signal is included in the data enable synchronization signal during a blank section.

In embodiments of the present invention, the second display panel driver receives the accumulation synchronization signal, which has an activation level, to accumulate the stress.

In embodiments of the present invention, when the first display panel driver accumulates the stress for the first area in an N-th frame, the accumulation synchronization signal has the activation level in a front porch section of the N-th frame, wherein N is a positive integer.

In embodiments of the present invention, when the first display panel driver accumulates the stress for the first area in an N-th frame, the accumulation synchronization signal has the activation level in a back porch section of an (N−1)th frame, wherein N is a positive integer greater than or equal to 2.

In embodiments of the present invention, the first display panel driver provides shared data to the second display panel driver, and wherein the accumulation synchronization signal is included in the shared data.

In embodiments of the present invention, the accumulation synchronization signal is included in the shared data during a section in which the shared data is not transmitted.

In embodiments of the present invention, the shared data is data that is related to global compensation of the display panel.

In embodiments of the present invention, the first display panel driver and the second display panel driver accumulate the stress in each frame at a predetermined cycle.

In embodiments of the present invention, the first display panel driver and the second display panel driver accumulate the stress in a frame that is randomly determined within one frame group that includes K frames, wherein K is a positive integer greater than or equal to 2.

According to embodiments of the present invention, a display device includes: a display panel including sub-pixels, a first area, a second area, wherein the sub-pixels are disposed in the first area and the second area; a first display panel driver configured to drive the first area, to accumulate stress for the first area to generate a first stress accumulation value, and to compensate for input image data that is for the first area based on the first stress accumulation value; and a second display panel driver configured to drive the second area, to accumulate stress for the second area to generate a second stress accumulation value, and to compensate for input image data that is for the second area based on the second stress accumulation value, wherein each of the first display panel driver and the second display panel driver accumulate the stress in each frame.

In embodiments of the present invention, the display device further includes a gate driver configured to provide gate signals to the sub-pixels, wherein the first display panel driver controls the gate driver.

According to embodiments of the present invention, a method of driving a display device including a first display panel driver, which is configured to drive a first area of a display panel, and a second display panel driver, which is configured to drive a second area of the display panel, includes: accumulating first stress data based on greyscales for subpixels in the first area by the first display panel driver; accumulating second stress data based on greyscales for subpixels for the second area by the second display panel driver in synchronization with the accumulation of the first stress data; compensating for input image data for the first area based on a first stress accumulation value that is generated by accumulating the first stress data of the first area; and compensating for input image data for the second area based on a second stress accumulation value that is generated by accumulating the second stress data of the second area.

In embodiments of the present invention, the first display panel driver provides an accumulation synchronization signal to the second display panel driver, and wherein the second display panel driver is synchronized with the accumulation of the first stress data by the first display panel driver through the accumulation synchronization signal.

In embodiments of the present invention, the first display panel driver provides a data enable synchronization signal, which has an activation level, to the second display panel driver during an active section, and wherein the accumulation synchronization signal is included in the data enable synchronization signal.

In embodiments of the present invention, the first display panel driver provides shared data to the second display panel driver, and wherein the accumulation synchronization signal is included in the shared data.

In embodiments of the present invention, the accumulation of the first stress data of the first area by the first display panel driver and the accumulation of the second stress data of the second area by the second display panel driver occurs in each frame at a predetermined cycle.

BRIEF DESCRIPTION OF THE DRAWINGS

The above and other features of the present invention will become more apparent by describing in further detail embodiments thereof with reference to the accompanying drawings, in which.

DETAILED DESCRIPTION OF THE EMBODIMENTS

Figure 1:
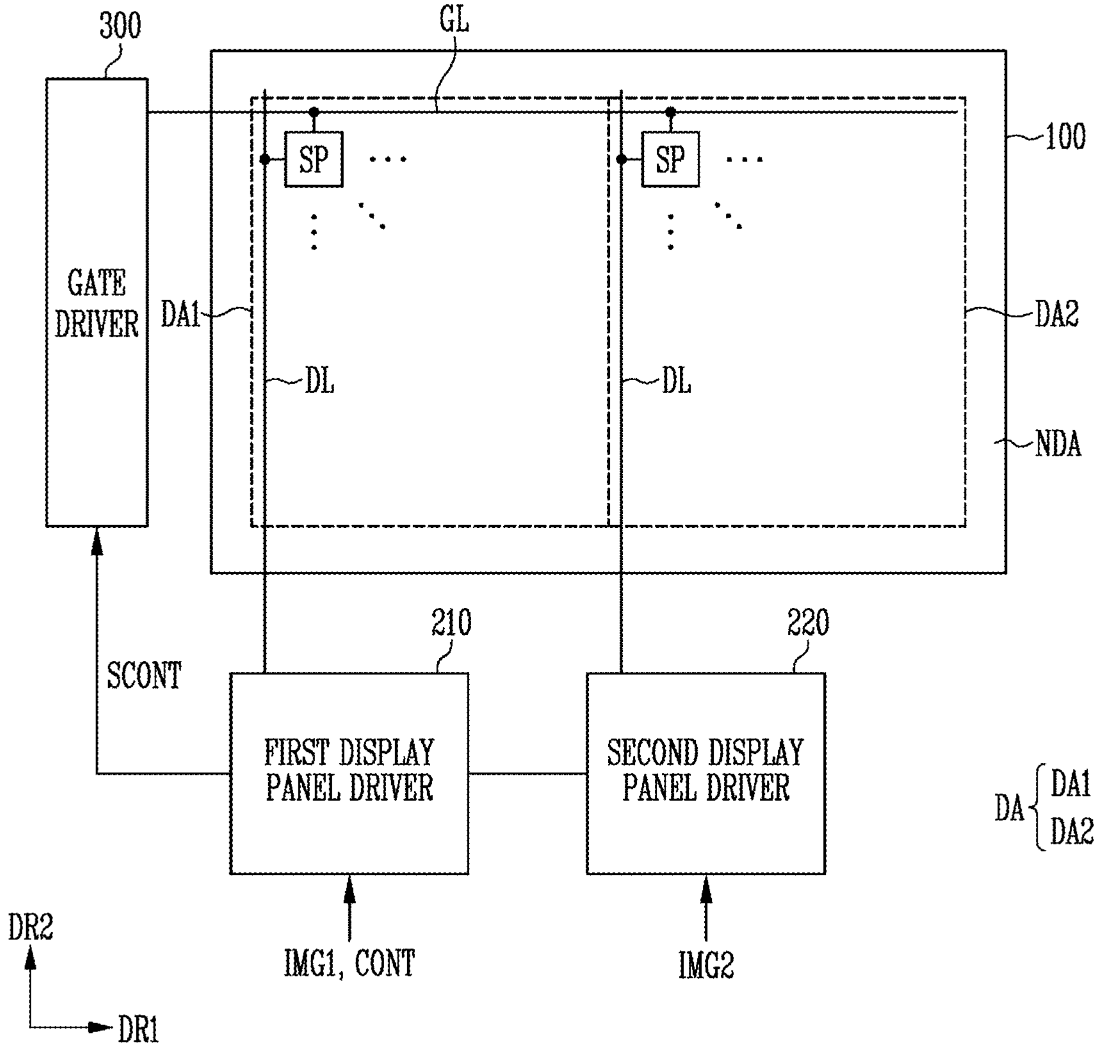
FIG. 1 is a block diagram illustrating a display device according to embodiments of the present invention.

Hereinafter, embodiments of the present invention will be described in more detail with reference to the accompanying drawings. In addition, the present invention is not limited to the embodiments described herein and may be embodied in other forms. The embodiments described herein are provided merely to explain in detail enough to enable those skilled in the art to easily implement the technical idea of the present invention.

Throughout the specification, in a case where a portion is “connected” to another portion, the case includes not only a case where the portion is “directly connected” but also a case where the portion is “indirectly connected” with another element interposed therebetween. Terms used herein are for describing specific embodiments and are not intended to limit the present invention. “At least any one of X, Y, and Z” and “at least any one selected from a group consisting of X, Y, and Z” may be interpreted as one X, one Y, one Z, or any combination of two or more of X, Y, and Z (for example, XYZ, XYY, YZ, and ZZ). Here, “and/or” includes all combinations of one or more of corresponding configurations.

Here, terms such as first and second may be used to describe various components, but these components are not limited to these terms. These terms are used to distinguish one component from another component. Therefore, a first component may refer to a second component within the technical scope and spirit of the present invention.

Spatially relative terms such as “under”, “on”, and the like may be used for descriptive purposes, thereby describing the relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned “under” other elements or features are positioned in a direction “on” the other elements or features. Therefore, in an embodiment of the present invention, the term “under” may include both directions of on and under. In addition, the device may face in other directions (for example, rotated 90 degrees or in other directions) and thus the spatially relative terms used herein are interpreted according thereto.

Various embodiments are described with reference to drawings schematically illustrating example embodiments. Accordingly, it will be expected that shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the present embodiments are not limited thereto.

As is traditional in the field of the present invention, embodiments may be described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the present invention. Further, the blocks, units and/or modules of the embodiments may be physically combined into more complex blocks, units and/or modules without departing from the scope of the present invention.

Hereinafter, the present invention will be described in more detail with reference to the attached drawings.

FIG. 1 is a block diagram illustrating a display device according to embodiments of the present invention.

Referring to FIG. 1, a display device may include a display panel 100, display panel drivers 210 and 220, and a gate driver 300.

The display panel 100 may include a display area DA that displays an image and a non-display area NDA that is disposed adjacent to the display area DA. In one embodiment of the present invention, the gate driver 300 may be mounted in the non-display area NDA.

The display panel 100 may include a plurality of gate lines GL, a plurality of data lines DL, and a plurality of sub-pixels SP electrically connected to the gate lines GL and the data lines DL. The gate lines GL may extend in a first direction DR1, and the data lines DL may extend in a second direction DR2 that intersects the first direction DR1.

The display area DA may include a first area DA1 and a second area DA2. The display panel drivers 210 and 220 may include a first display panel driver 210, which drives the first area DA1, and a second display panel driver 220, which drives the second area DA2.

The first display panel driver 210 may control the gate driver 300 and provide a synchronization signal to the second display panel driver 220. The second display panel driver 220 may receive the synchronization signal from the first display panel driver 210 and drive the second area DA2 in synchronization with the first display panel driver 210. For example, the first display panel driver 210 may be a master driver, and the second display panel driver 220 may be a slave driver.

In the present embodiment, two display panel drivers 210 and 220 are shown as an example, but the present invention is not limited to the number of display panel drivers 210 and 220.

The display panel drivers 210 and 220 may receive input image data IMG1 and IMG2 from a main processor (for example, a central processing unit, a graphic processing unit (GPU) or the like). For example, the first display panel driver 210 may receive input image data IMG1 (hereinafter referred to as first input image data) for the first area DA1, and the second display panel driver 220 may receive input image data IMG2 (hereinafter referred to as second input image data) for the second area DA2. For example, the input image data IMG1 and IMG2 may include red image data, green image data, and blue image data. In one embodiment of the present invention, the input image data IMG1 and IMG2 may further include white image data. For example, the input image data IMG1 and IMG2 may include magenta image data, yellow image data, and cyan image data.

The first display panel driver 210 may receive an input control signal CONT. For example, the input control signal CONT may include a master clock signal and a data enable signal. For example, the input control signal CONT may further include a vertical synchronization signal and a horizontal synchronization signal.

However, the present invention is not limited to a case where only the first display panel driver 210 receives the input control signal CONT. For example, the second display panel driver 220 may also receive the input control signal CONT, and the first display panel driver 210 and the second display panel driver 220 may be synchronized with each other through a synchronization signal.

The first display panel driver 210 may control the gate driver 300. The first display panel driver 210 may generate a scan control signal SCONT to control the operation of the gate driver 300 and provide the scan control signal SCONT to the gate driver 300. For example, the scan control signal SCONT may include a vertical start signal and a gate clock signal.

The gate driver 300 may generate gate signals, in response to the scan control signal SCONT that is input from the first display panel driver 210, for driving the gate lines GL. The gate driver 300 may output the gate signals to the gate lines GL. For example, the gate driver 300 may sequentially output the gate signals to the gate lines GL based on the scan control signal SCONT.

The display panel drivers 210 and 220 may generate data voltages. The first display panel driver 210 may output the data voltages to a data line DL of the first area DA1. The second display panel driver 220 may output the data voltages to a data line DL of the second area DA2.

Figure 2:
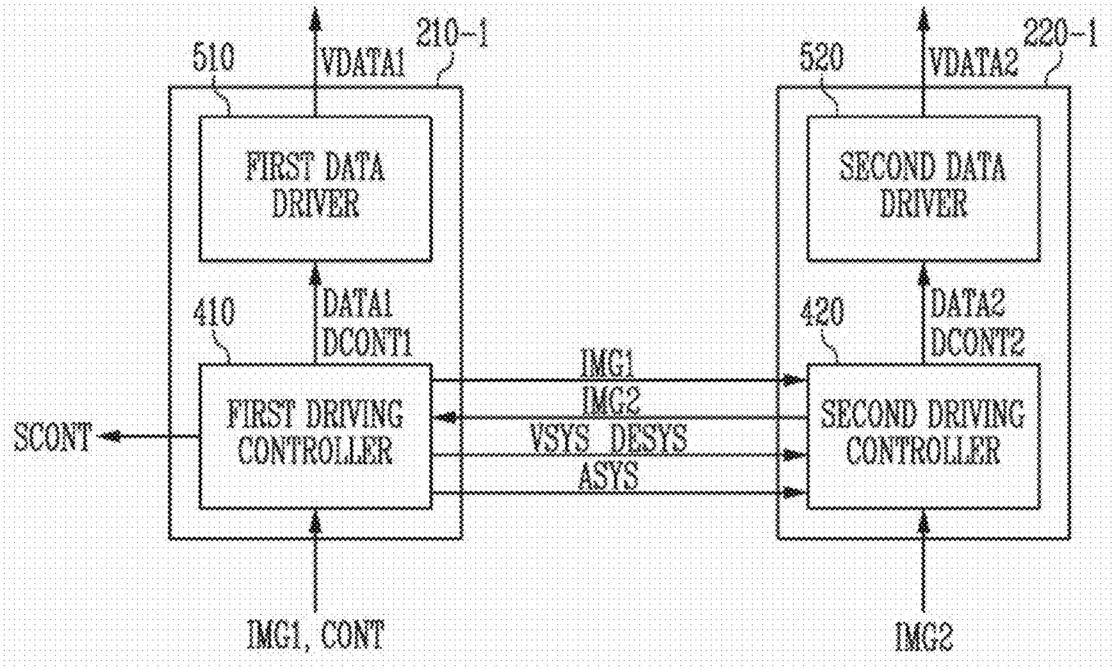
FIG. 2 is a block diagram illustrating first and second display panel drivers of FIG. 1.

FIG. 2 is a block diagram illustrating first and second display panel drivers of FIG. 1.

Referring to FIG. 2, a first display panel driver 210-1 may include a first driving controller 410 and a first data driver 510.

The first driving controller 410 may generate the scan control signal SCONT, a first data control signal DCONT1, which is for controlling the operation of the first data driver 510, and a first data signal DATA1 based on the first input image data IMG1 and the input control signal CONT. The first driving controller 410 may output the first data control signal DCONT1 to the first data driver 510. For example, the first data control signal DOCNT1 may include a horizontal start signal and a load signal. The first driving controller 410 may output the first data signal DATA1 to the first data driver 510.

The first data driver 510 may receive the first data control signal DCONT1 and the first data signal DATA1 from the first driving controller 410. The first data driver 510 may generate first data voltages VDATA1 by converting the received first data signal DATA1 into an analog voltage. The first data driver 510 may output the first data voltages VDATA1 to the data line DL of the first area DA1 (see FIG. 1).

In one embodiment of the present invention, the first driving controller 410 may receive the second input image data IMG2 (or data corresponding to the second input image data IMG2) from a second driving controller 420. In addition, the first driving controller 410 may compensate for the first input image data IMG1 or adjust scan timing and/or data writing timing based on the second input image data IMG2. However, the first driving controller 410 according to an embodiment of the present invention does not necessarily need to receive the second input image data IMG2 from the second driving controller 420.

A second display panel driver 220-1 may include the second driving controller 420 and a second data driver 520.

The second driving controller 420 may generate a second data control signal DCONT2, which is for controlling the operation of the second data driver 520, and a second data signal DATA2 based on the second input image data IMG2, a vertical synchronization signal VSYS, and a data enable synchronization signal DESYS.

The vertical synchronization signal VSYS may indicate the start of each frame. For example, when each frame starts, the vertical synchronization signal VSYS may have an activation level. The data enable synchronization signal DESYS may indicate a section in which data voltages VDATA1 and VDATA2 are written. For example, in an active section ACT (see FIG. 5) where the data voltages VDATA1 and VDATA2 are written, the data enable synchronization signal DESYS may have an activation level.

The second driving controller 420 may generate the second data control signal DCONT2, which is for controlling the operation of the second data driver 520, and the second data signal DATA2 based on the second input image data IMG2, the vertical synchronization signal VSYS, and the data enable synchronization signal DESYS. The second driving controller 420 may output the second data control signal DCONT2 to the second data driver 520. For example, the second data control signal DCONT2 may include a horizontal start signal and a load signal. The second driving controller 420 may output the second data signal DATA2 to the second data driver 520.

However, the present invention is not limited thereto, and the second driving controller 420 may receive the input control signal CONT from a host processor and generate the second data control signal DCONT2 and the second data signal DATA2 based on the second input image data IMG2 and the input control signal CONT. Even in this case, at least one of the vertical synchronization signal VSYS or the data enable synchronization signal DESYS may be used to synchronize the first display panel driver 210-1 and the second display panel driver 220-1 with each other.

The second data driver 520 may receive the second data control signal DCONT2 and the second data signal DATA2 from the second driving controller 420. The second data driver 520 may generate second data voltages VDATA2 by converting the second data signal DATA2 into an analog voltage. The second data driver 520 may output the second data voltages VDATA2 to the data line DL of the second area DA2 (see FIG. 1).

In one embodiment of the present invention, the second driving controller 420 may receive the first input image data IMG1 (or data corresponding to the first input image data IMG1) from the first driving controller 410. In addition, the second driving controller 420 may compensate for the second input image data IMG2 or adjust data writing timing and the like based on the first input image data IMG1. However, the second driving controller 420 according to an embodiment of the present invention does not necessarily need to receive the first input image data IMG1 from the first driving controller 410.

The first driving controller 410 may accumulate stress for the first area DA1 (see FIG. 1) to generate a first stress accumulation value and compensate for the first input image data IMG1 based on the first stress accumulation value. The second driving controller 420 may accumulate stress for the second area DA2 (see FIG. 1) to generate a second stress accumulation value and compensate for the second input image data IMG2 based on the second stress accumulation value.

When stress is accumulated, the first driving controller 410 may provide an accumulation synchronization signal ASYS, which has an activation level, to the second driving controller 420. For example, the accumulation synchronization signal ASYS having the activation level may be generated when the first driving controller 410 accumulates the stress for the first area DA1. The second driving controller 420 may accumulate stress for the second area DA2 (see FIG. 1) in response to the accumulation synchronization signal ASYS.

In this way, the display panel drivers 210-1 and 220-1 may be synchronized with each other through the accumulation synchronization signal ASYS to accumulate stress. Therefore, the boundary compensation deviation caused by the display panel drivers 210-1 and 210-2 accumulating stress of different frames can be improved and visibility can be increased.

In the present embodiment, a case where the first driving controller 410 provides the synchronization signals VSYS, DESYS, and ASYS to the second driving controller 420 is described, but the present invention is not limited thereto. For example, the second driving controller 420 may provide the synchronization signals VSYS, DESYS, and ASYS to the first driving controller 410.

In addition, in the present embodiment, a case where the driving controllers 410 and 420 and the data drivers 510 and 520 are composed of one component (for example, one chip) is described, but the present invention is not limited thereto. For example, the driving controllers 410 and 420 and the data drivers 510 and 520 may be composed of separate components (for example, separate chips).

Figure 3:
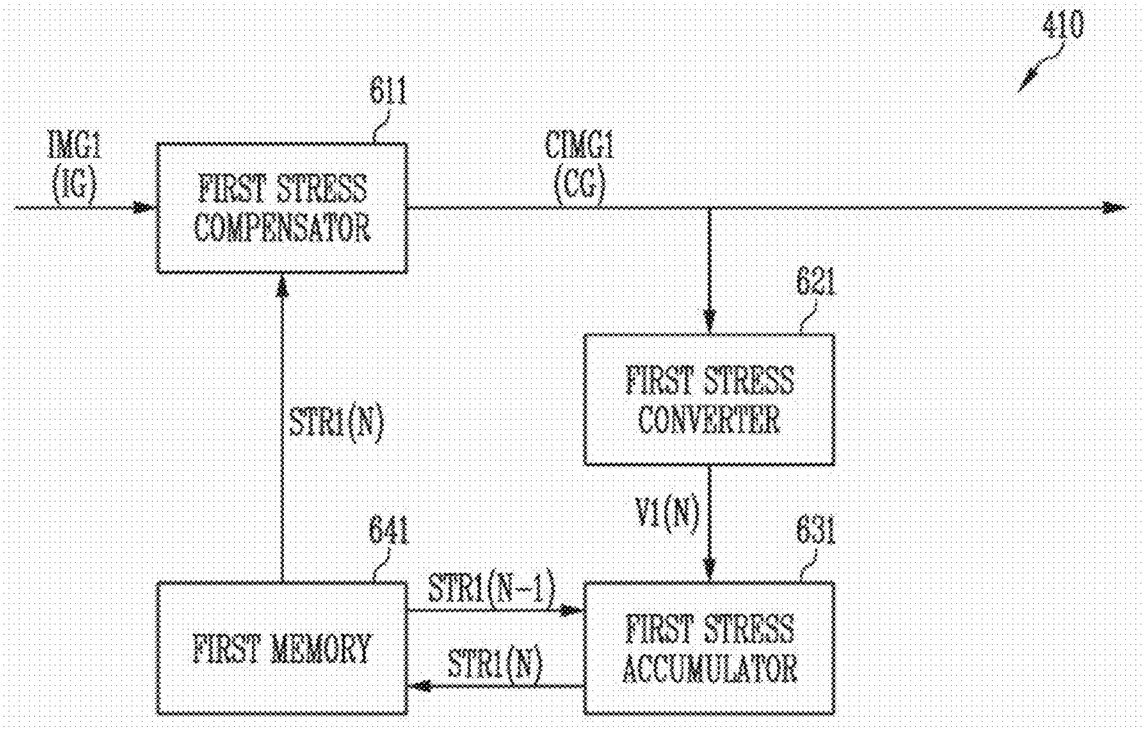
FIG. 3 is a block diagram illustrating an example of a first driving controller of FIG. 2.
Figure 4:
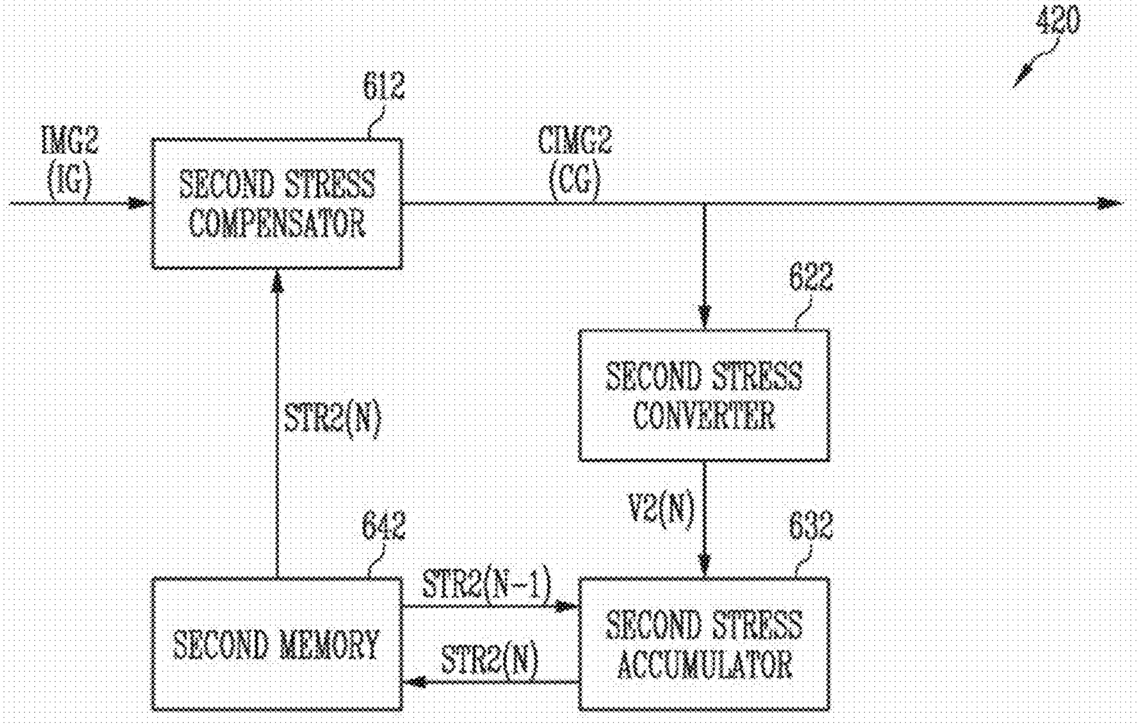
FIG. 4 is a block diagram illustrating an example of a second driving controller of FIG. 2.

FIG. 3 is a block diagram illustrating an example of a first driving controller of FIG. 2. FIG. 4 is a block diagram illustrating an example of a second driving controller of FIG. 2.

Referring to FIG. 3, the first driving controller 410 may include a first stress compensator (e.g., a first stress compensator circuit) 611, a first stress converter (e.g., a first stress converter circuit) 621, a first stress accumulator (e.g., a first stress accumulator circuit) 631, and a first memory 641.

Hereinafter, for convenience of description, one input grayscale IG and one compensation grayscale CG for one sub-pixel SP (see FIG. 1) will be described. In the same way, the first driving controller 410 may convert input grayscales IG for all sub-pixels SP (see FIG. 1) that are included in the first area DA1 (see FIG. 1) into compensation grayscales CG.

The first stress compensator 611 may compensate for input grayscales IG of the first input image data IMG1 to generate first compensation image data CIMG1 having the compensation grayscales CG. The first stress compensator 611 may apply a compensation value to the input grayscale IG. The first driving controller 410 may generate the first data signal DATA1 (see FIG. 2) based on the first compensation image data CIMG1.

The first driving controller 410 may generate a first stress value V1 (N) based on the compensation grayscale CG. The first driving controller 410 may update the first stress accumulation value STR1 (N) by adding the first stress value V1 (N) to a first stress accumulation value STR1 (N−1) to which a first accumulation coefficient is applied. The first driving controller 410 may generate a compensation value based on a first stress accumulation value STR1 (N). The first driving controller 410 may apply the compensation value to the input grayscale IG for the sub-pixel SP (see FIG. 1) to generate the compensation grayscale CG.

Hereinafter, it may be assumed that the input grayscale IG and the compensation grayscale CG are values corresponding to the sub-pixel SP (see FIG. 1) in an N-th image frame. Here, N may be a positive integer greater than or equal to 2.

The first stress converter 621 may convert the compensation grayscale CG into the first stress value V1 (N) of a voltage domain. The first stress value V1 (N) may correspond to the compensation grayscale CG. If the compensation grayscale CG has a range of 0 to 255 expressed in 8 bits, the smaller the compensation grayscale CG (e.g., closer to black) and the greater the first stress value V1 (N) may be. This may be a case where a driving transistor of the sub-pixel SP shown in FIG. 1 is composed of a P-type transistor. If the compensation grayscale CG is already a value of the voltage domain (for example, a voltage code or a voltage value), the smaller the compensation grayscale CG and the smaller the first stress value V1 (N) may be. For example, the compensation grayscale CG may be the same as the first stress value V1 (N). However, even if the compensation grayscale CG is a value of the voltage domain, for logic optimization, the first stress converter 621 may generate the first stress value V1 (N) by applying a weight to the compensation grayscale CG and quantizing it.

The first stress value V1 (N) may be a stress value when a first data voltage VDATA1 (see FIG. 2) is applied to the sub-pixel SP (see FIG. 1). For example, the first stress value V1 (N) may be a stress value when the first data voltage VDATA1 (see FIG. 2) is applied to the sub-pixel SP (see FIG. 1) for a predetermined period.

The first memory 641 may store the first stress accumulation value STR1 (N−1) for frames that are previous to the current frame. For example, if the current frame is an N-th frame, the first stress accumulation value STR1 (N−1) may be stresses accumulated during 1st, 2nd, 3rd, . . . , (N−1)th frames. However, stress does not necessarily have to accumulate in every frame.

The first stress accumulator 631 may update the first stress accumulation value STR1 (N) by adding the first stress value V1 (N) to the first stress accumulation value STR1 (N−1) to which the first accumulation coefficient is applied (see Equation 1).

$$STR1(N) = V1(N) + AC1 * STR1(N-1) \qquad \text{[Equation 1]}$$

Here, AC1 may be the first accumulation coefficient.

However, in embodiments of the present invention, a method of accumulating stress is not limited to Equation 1.

The updated first stress accumulation value STR1 (N) may be stored in the first memory 641.

The first stress compensator 611 may generate a compensation value based on the first stress accumulation value STR1 (N). This compensation value may be applied to the input grayscale IG of the first input image data IMG1 of the next frame (for example, an (N+1)th frame).

The first stress compensator 611 may generate the compensation value based on the first stress accumulation value STR1 (N) (see Equation 2).

$$compData = (STR1(N) - STR1\exp(N)) * GA \qquad \text{[Equation 2]}$$

Here, compData may be the compensation value, and STR1exp (N) may be an expected accumulation value. The GA may be a grayscale gain. The expected accumulation value may be a stress accumulation value when stress of V1 (N) is continuously received from the first frame to the N-th frame. The grayscale gain may be applied differently for each grayscale or grayscale section.

The first stress compensator 611 may apply the compensation value compData (see Equation 2) to the input grayscale IG for the sub-pixel SP (see FIG. 1) to generate the compensated grayscale CG. For example, when units of the input grayscale IG, the compensation value, and the compensation grayscale CG are the same as each other (for example, when the input grayscale IG, the compensation value, and the compensation grayscale CG are voltage domains), the first stress compensator 611 may generate the compensation grayscale CG by adding the compensation value compData to the input grayscale IG.

However, in embodiments of the present invention, a method of generating the compensation value is not limited to Equation 2.

Referring to FIG. 4, the second driving controller 420 may include a second stress compensator (e.g., a second stress compensator circuit) 612, a second stress converter (e.g., a second stress converter circuit) 622, a second stress accumulator (e.g., a second stress accumulator circuit) 632, and a second memory 642.

Hereinafter, for convenience of description, one input grayscale IG and one compensation grayscale CG for one sub-pixel SP (see FIG. 1) will be described. In the same way, the second driving controller 420 may convert input grayscales IG for all sub-pixels SP (see FIG. 1) that are included in the second area DA2 (see FIG. 1) into compensation grayscales CG.

The second stress compensator 612 may compensate for input grayscales IG of the second input image data IMG2 to generate second compensation image data CIMG2 having the compensation grayscales CG. The second stress compensator 612 may apply a compensation value to the input grayscale IG. The second driving controller 420 may generate the second data signal DATA2 (see FIG. 2) based on the second compensation image data CIMG2.

The second driving controller 420 may generate a second stress value V2 (N) based on the compensation grayscale CG. The second driving controller 420 may update the second stress accumulation value STR2 (N) by adding the second stress value V2 (N) to a second stress accumulation value STR2 (N−1) to which a second accumulation coefficient is applied. The second driving controller 420 may generate a compensation value based on the second stress accumulation value STR2 (N). The second driving controller 420 may apply the compensation value to the input grayscale IG for the sub-pixel SP (see FIG. 1) to generate the compensation grayscale CG.

Hereinafter, it may be assumed that the input grayscale IG and the compensation grayscale CG are values corresponding to the sub-pixel (SP, see FIG. 1) in the N-th image frame.

The second stress converter 622 may convert the compensation grayscale CG into the second stress value V2 (N) of a voltage domain. The second stress value V2 (N) may correspond to the compensation grayscale CG. If the compensation grayscale CG has a range of 0 to 255 expressed in 8 bits, the smaller the compensation grayscale CG (e.g., closer to black) and the greater the second stress value V2 (N) may be. This may be a case where the driving transistor of the sub-pixel SP shown in FIG. 1 is composed of a P-type transistor. If the compensation grayscale CG is already a value of the voltage domain (for example, a voltage code or a voltage value), the smaller the compensation grayscale CG and the smaller the second stress value V2 (N) may be. For example, the compensation grayscale CG may be the same as the second stress value V2 (N). However, even if the compensation grayscale CG is a value of the voltage domain, for logic optimization, the second stress converter 622 may generate the second stress value V2 (N) by applying a weight to the compensation grayscale CG and quantizing it.

The second stress value V2 (N) may be a stress value when a second data voltage VDATA2 (see FIG. 2) is applied to the sub-pixel SP (see FIG. 1). For example, the second stress value V2 (N) may be a stress value when the second data voltage VDATA2 (see FIG. 2) is applied to the sub-pixel SP (see FIG. 1) for a predetermined period.

The second memory 642 may store the second stress accumulation value STR2 (N−1) for frames that are previous to the current frame. For example, if the current frame is the N-th frame, the second stress accumulation value STR2 (N−1) may be stresses accumulated during the 1st, 2nd, 3rd, . . . , (N−1)th frames. However, stress does not necessarily have to accumulate in every frame.

The second stress accumulator 632 may update the second stress accumulation value STR2 (N) by adding the second stress value V2 (N) to the second stress accumulation value STR2 (N−1) to which the second accumulation coefficient is applied (see Equation 3).

$$STR2(N) = V2(N) + AC2 * STR2(N-1) \quad \text{[Equation 3]}$$

Here, AC2 may be the second accumulation coefficient.

However, in embodiments of the present invention, a method of accumulating stress is not limited to Equation 3.

The updated second stress accumulation value STR2 (N) may be stored in the second memory 642.

The second stress compensator 612 may generate a compensation value based on the second stress accumulation value STR2 (N). This compensation value may be applied to the input grayscale IG of the second input image data IMG2 of the next frame (for example, the (N+1)th frame).

The second stress compensator 612 may generate the compensation value based on the second stress accumulation value STR2 (N) (see Equation 4).

$$compData = (STR2(N) - STR2\exp(N)) * GA \quad \text{[Equation 4]}$$

Here, compData may be the compensation value, and STR2exp (N) may be an expected accumulation value. The GA may be a grayscale gain. The expected accumulation value may be a stress accumulation value when stress of V2 (N) is continuously received from the first frame to the N-th frame. The grayscale gain may be applied differently for each grayscale or grayscale section.

The second stress compensator 612 may apply the compensation value compData (see Equation 4) to the input grayscale IG for the sub-pixel SP (see FIG. 1) to generate the compensated grayscale CG. For example, when units of the input grayscale IG, the compensation value, and the compensation grayscale CG are the same as each other (for example, when the input grayscale IG, the compensation value, and the compensation grayscale CG are voltage domains), the second stress compensator 612 may generate the compensation grayscale CG by adding the compensation value compData to the input grayscale IG.

However, in embodiments of the present invention, a method of generating the compensation value is not limited to Equation 4.

The second driving controller 420 may accumulate the second stress value V2 (N) in synchronization with the accumulation synchronization signal ASYS (see FIG. 2). In one embodiment of the present invention, the accumulation synchronization signal ASYS (see FIG. 2) may be applied to at least one of the second stress converter 622, the second stress accumulator 632, the second memory 642, or a controller included in the second driving controller 420 that controls the second stress converter 622, the second stress accumulator 632, and the second memory 642.

Figure 5:
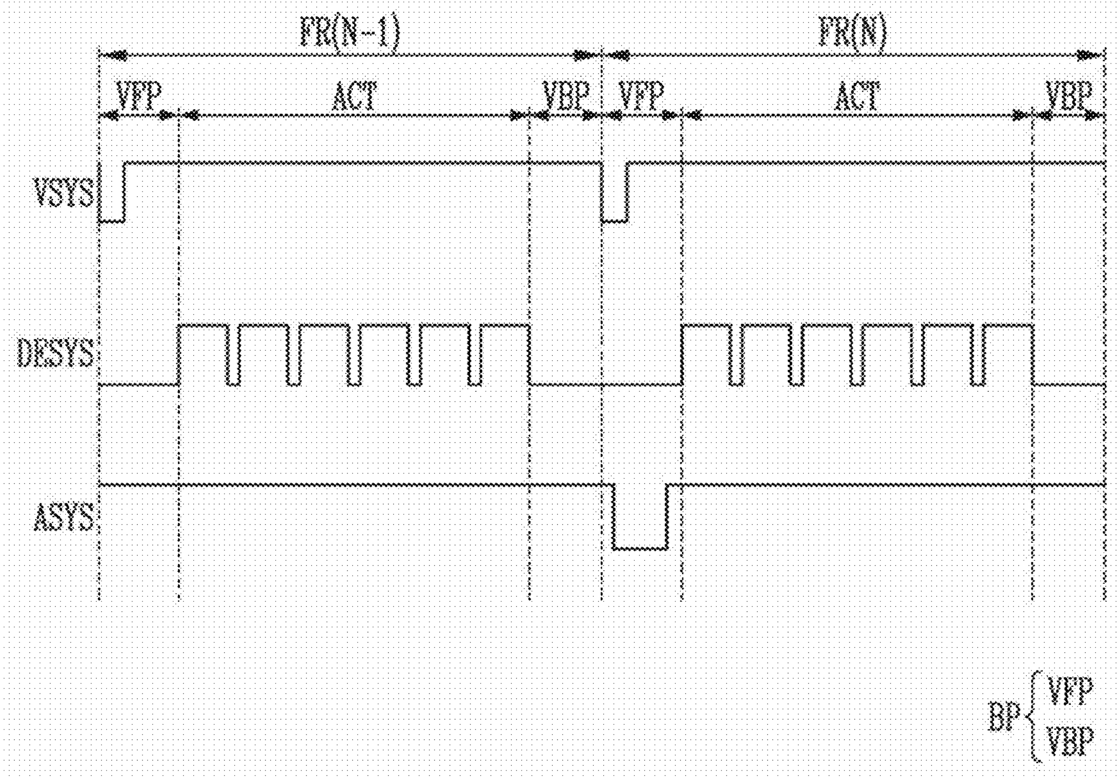
FIG. 5 is a timing diagram illustrating an example of a vertical synchronization signal, a data enable synchronization signal, and an accumulation synchronization signal of FIG. 2.

FIG. 5 is a timing diagram illustrating an example of a vertical synchronization signal, a data enable synchronization signal, and an accumulation synchronization signal of FIG. 2.

Referring to FIGS. 2 and 5, one frame may be divided into an active section ACT and a blank section BP. For example, data voltages VDATA1 and VDATA2 may be written in the active section ACT. Within one frame, the blank section BP may include a front porch section VFP and a back porch section VBP. The front porch section VFP may be disposed before the active section ACT, and the back porch section VBP may be disposed after the active section ACT.

The vertical synchronization signal VSYS may indicate the start of each frame. For example, when each frame starts, the vertical synchronization signal VSYS may have an activation level at the start.

For example, when an (N−1)th frame FR (N−1) starts, the vertical synchronization signal VSYS may have a low voltage level. For example, when an N-th frame FR (N) starts, the vertical synchronization signal VSYS may have the low voltage level. However, the activation level of the vertical synchronization signal VSYS is not limited to the low voltage level.

The data enable synchronization signal DESYS may indicate a section in which the data voltages VDATA1 and VDATA2 are written. For example, in the active section ACT, the data enable synchronization signal DESYS may have an activation level.

For example, in the active section ACT of the (N−1)th frame FR (N−1), the data enable synchronization signal DESYS may have a high voltage level. For example, in the active section ACT of the N-th frame FR (N), the data enable synchronization signal DESYS may have the high voltage level. However, the activation level of the data enable synchronization signal DESYS is not limited to the high voltage level.

The second display panel driver 220-1 may accumulate stress by receiving the accumulation synchronization signal ASYS having an activation level. For example, when accumulating the first stress value V1 (N), the first display panel driver 210-1 may output the accumulation synchronization signal ASYS, which has the activation level, to the second display panel driver 220-1.

For example, when the first display panel driver 210-1 accumulates the first stress value V1 (N) in the N-th frame FR (N), the accumulation synchronization signal ASYS may have the activation level in the front porch section VFP of the N-th frame FR (N). However, the present invention is not limited thereto. For example, the accumulation synchronization signal ASYS may have the activation level in at least one of the active section ACT of the N-th frame FR (N), the active section ACT of the (N−1)th frame FR (N−1), and the back porch section VBP of the (N−1)th frame. Accordingly, the second display panel driver 220-1 may accumulate the second stress value V2 (N) in the N-th frame FR (N).

As another example, after being at the activation level of the accumulation synchronization signal ASYS in the front porch section VFP of the N-th frame FR (N), the accumulation synchronization signal ASYS may have a low voltage in the front porch section VFP of the N-th frame FR (N) and may return to the activation level thereafter.

Figure 6:
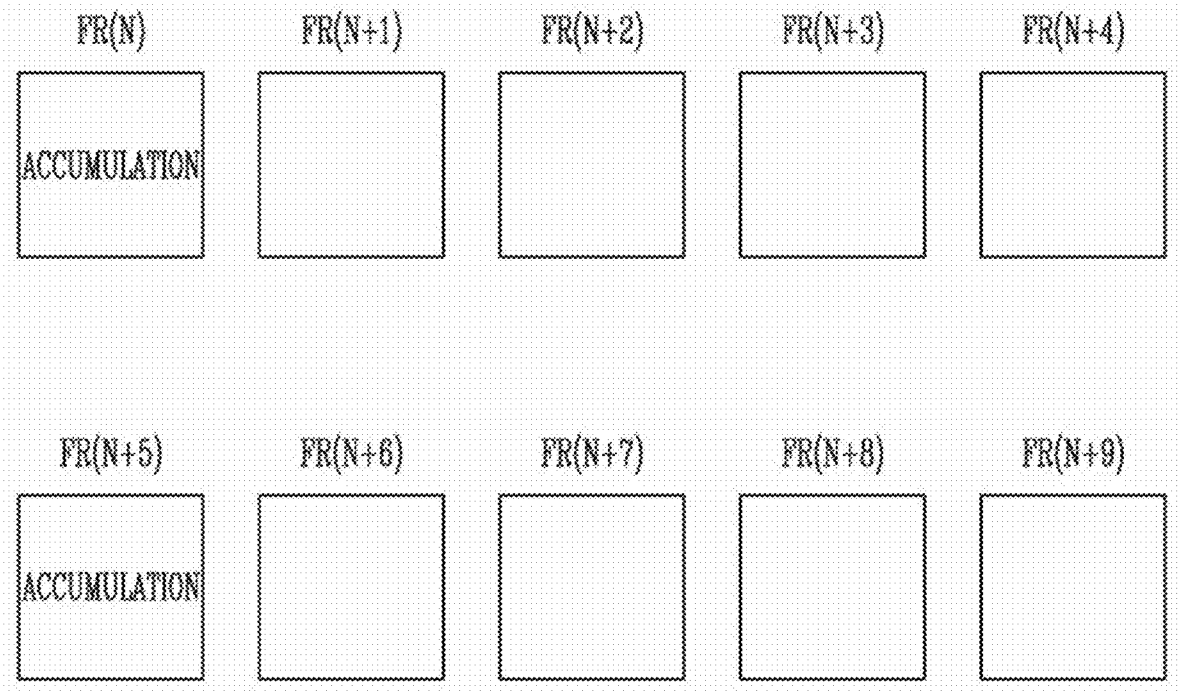
FIGS. 6 and 7 are diagrams illustrating an example of stress accumulation in the first and second display panel drivers of the display device of FIG. 1.
Figure 7:
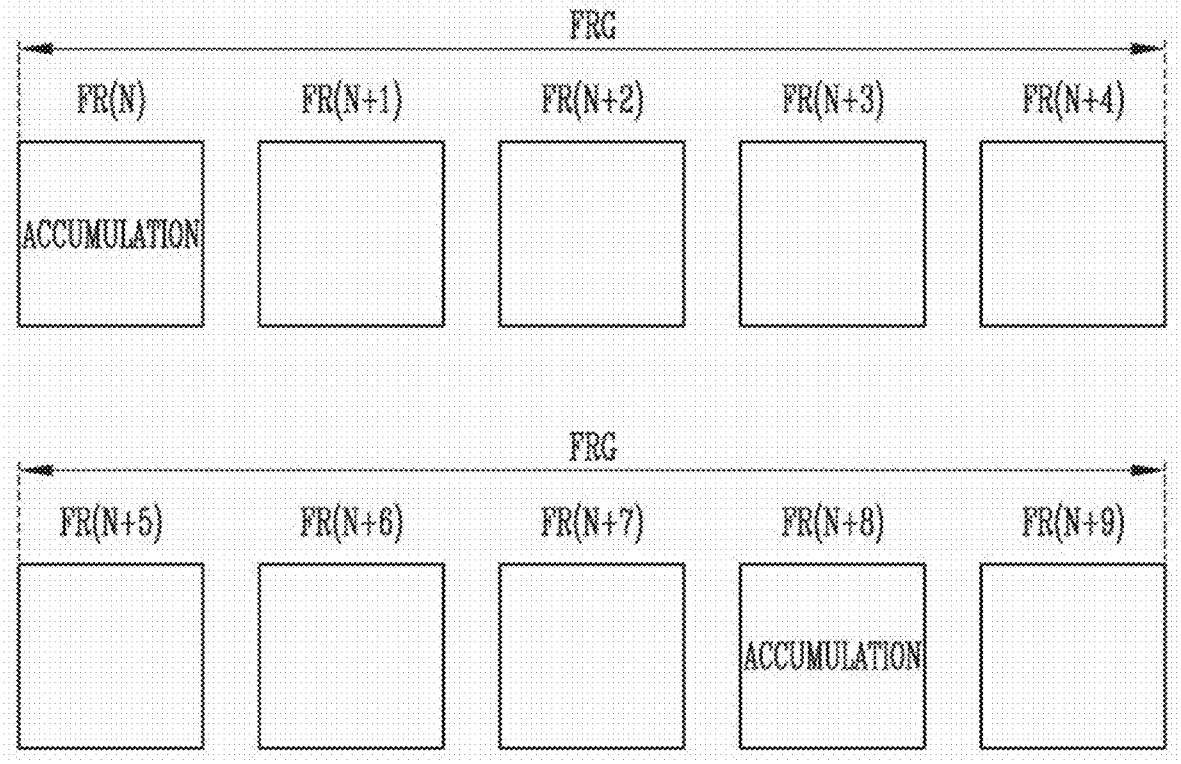

FIGS. 6 and 7 are diagrams illustrating an example of stress accumulation in the first and second display panel drivers of the display device of FIG. 1.

Referring to FIGS. 1 and 6, the first and second display panel drivers 210 and 220 may accumulate stress (for example, the first and second stresses values V1 (N) and V2 (N), see FIG. 2) in each frame at a predetermined cycle. For example, when accumulating stress every five frames, the first and second display panel drivers 210 and 220 may accumulate stress in the N-th frame FR (N) and then accumulate stress in an (N+5)th frame FR (N+5). However, the present invention is not limited to the cycle of accumulating stress. For example, stress may be accumulated in a cycle of frames that is less than or greater than five frames.

Referring to FIGS. 1 and 7, the first and second display panel drivers 210 and 220 may accumulate stress in a frame randomly determined within one frame group FRG including K frames. Here, K may be a positive integer greater than or equal to 2.

For example, when K is 5, the first and second display panel drivers 210 and 220 may randomly select one frame within a frame group FRG including the N-th frame FR (N) to an (N+4)th frame FR (N+4), and may accumulate stress in the one frame of the frame group FRG. In addition, the first and second display panel drivers 210 and 220 may select one frame within a frame group FRG including an (N+5)th frame FR (N+5) to an (N+9)th frame FR (N+9), and may accumulate stress in the one frame of the frame group FRG. However, the present invention is not limited to the number of frames within the frame group FRG.

Figure 8:
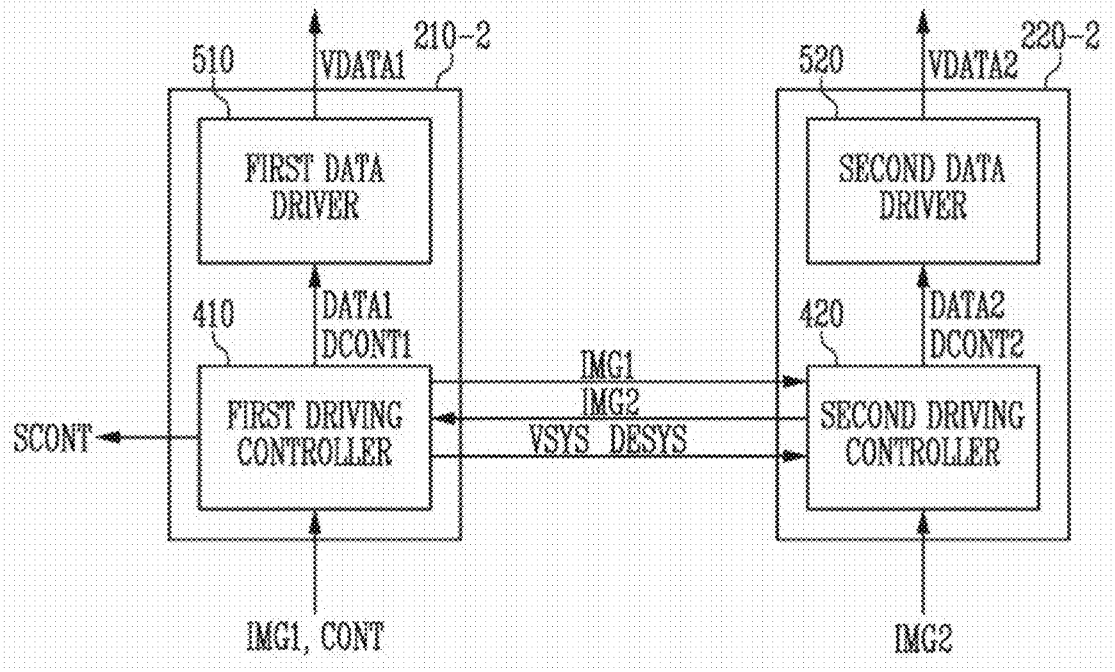
FIG. 8 is a block diagram illustrating first and second display panel drivers of the display device according to embodiments of the present invention.
Figure 9:
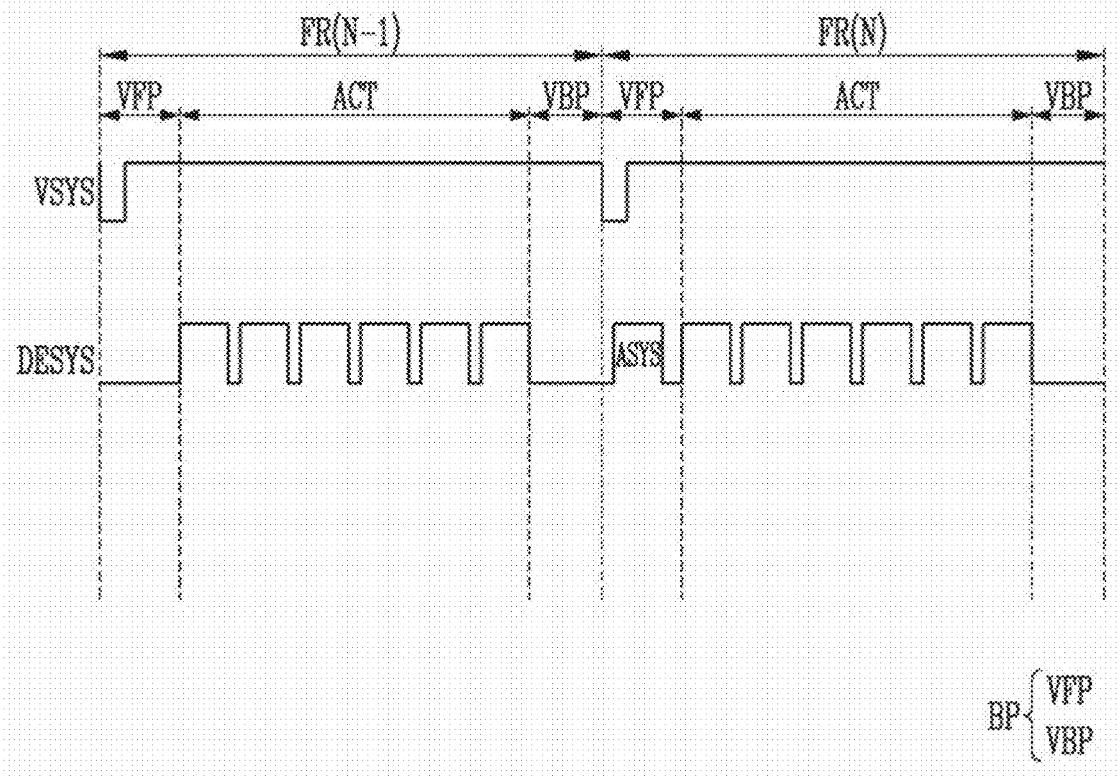
FIGS. 9 and 10 are diagrams illustrating an example of a vertical synchronization signal, a data enable synchronization signal, and an accumulation synchronization signal of FIG. 8.
Figure 10:
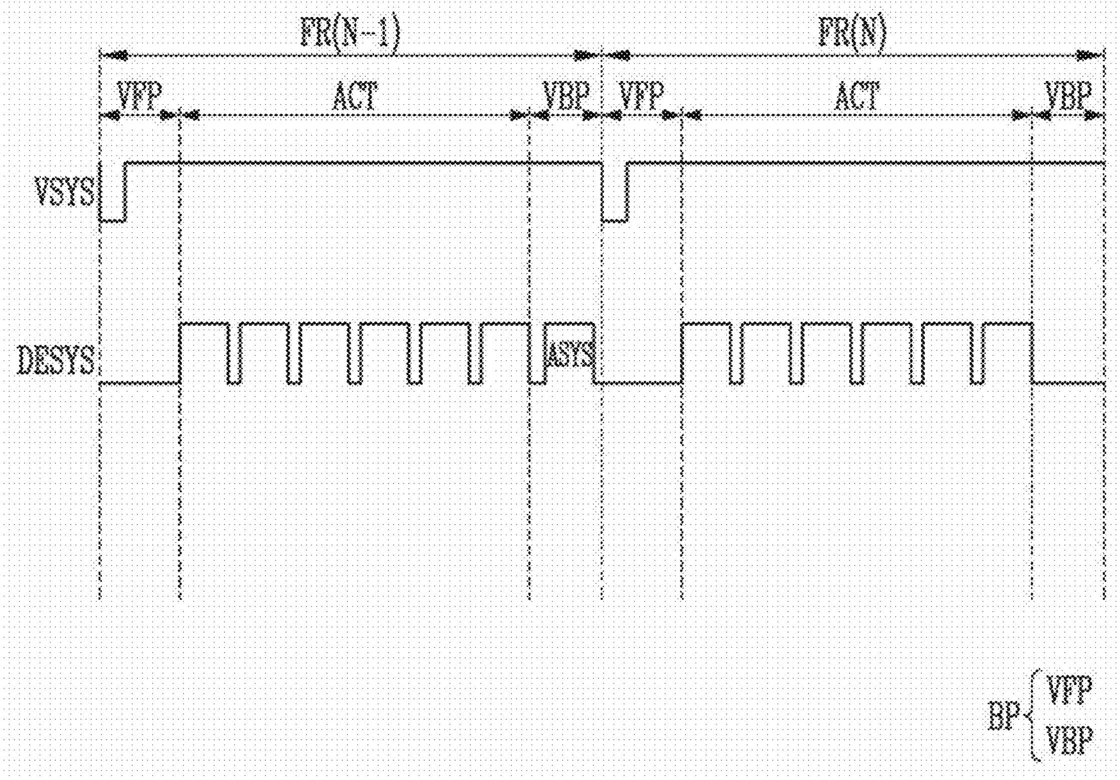

FIG. 8 is a block diagram illustrating first and second display panel drivers of the display device according to embodiments of the present invention. FIGS. 9 and 10 are diagrams illustrating an example of a vertical synchronization signal, a data enable synchronization signal, and an accumulation synchronization signal of FIG. 8.

First and second display panel drivers 210-2 and 220-2 according to the present embodiments may have substantially the same configuration as the first and second display panel drivers 210-1 and 220-1 of FIG. 2, except that there is no separate line to which the accumulation synchronization signal ASYS is applied. Therefore, the same reference numbers and symbols will be used for the same or similar components and elements, and overlapping descriptions will be omitted or briefly discussed.

Referring to FIGS. 8 to 10, the accumulation synchronization signal ASYS may be included in the data enable synchronization signal DESYS. For example, the accumulation synchronization signal ASYS may be included in the data enable synchronization signal DESYS in the blank section BP of a frame.

As described above, the data enable synchronization signal DESYS might not have the activation level in the blank section BP. For example, since the data enable synchronization signal DESYS is not used in the blank section BP, the first display panel driver 210-2 may generate the data enable synchronization signal DESYS that includes the accumulation synchronization signal ASYS in the blank section BP. For example, the accumulation synchronization signal ASYS may have an activation level in the back porch section VBP. Accordingly, a line for transmitting a signal can be reduced.

Referring to FIGS. 8 and 9, the accumulation synchronization signal ASYS may have the activation level in the front porch section VFP of the frame in which stress is accumulated. For example, when the first display panel driver 210-2 accumulates stress (for example, the first stress V1 (N), see FIG. 3) for the first area DA1 (see FIG. 1) in the N-th frame FR (N), the accumulation synchronization signal ASYS may have the activation level in the front porch section VFP of the N-th frame FR (N). In addition, the second display panel driver 220-2 may accumulate stress (for example, the second stress value V2 (N), see FIG. 3) for the second area DA2 (see FIG. 1) in the N-th frame FR (N).

Referring to FIGS. 8 and 10, the accumulation synchronization signal ASYS may have the activation level in the back porch section VBP of the frame before the frame in which stress is accumulated. For example, when the first display panel driver 210-2 accumulates stress (for example, the first stress V1 (N), see FIG. 3) for the first area DA1 (see FIG. 1) in the N-th frame FR (N), the accumulation synchronization signal ASYS may have the activation level in the back porch section VBP of the (N−1)th frame FR (N−1). In addition, the second display panel driver 220-2 may accumulate stress (for example, the second stress value V2 (N), see FIG. 3) for the second area DA2 (see FIG. 1) in the N-th frame FR (N).

Figure 11:
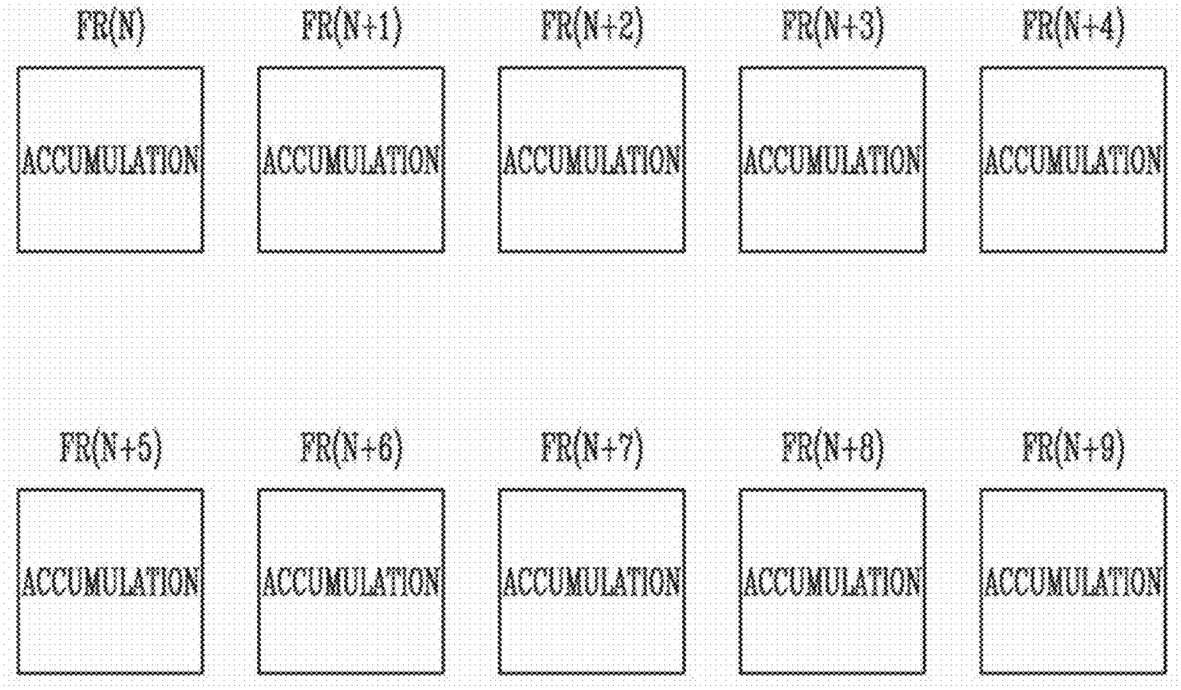
FIG. 11 is a diagram illustrating an example of stress accumulation in the first and second display panel drivers of the display device according to embodiments of the present invention.

FIG. 11 is a diagram illustrating an example of stress accumulation in the first and second display panel drivers of the display device according to embodiments of the present invention.

A display device according to the present embodiments may have substantially the same configuration as the display device of FIG. 8, except that stress is accumulated every frame and there is no accumulation synchronization signal ASYS (see FIG. 8). Therefore, the same reference numbers and symbols will be used for the same or similar components or elements, and overlapping descriptions will be omitted or briefly discussed.

Referring to FIGS. 8 and 11, the first and second display panel drivers 210-2 and 220-2 may accumulate stress in each frame. When stress is accumulated in each frame, since the first and second display panel drivers 210-2 and 220-2 do not accumulate stress of different frames, the boundary compensation deviation can be improved.

Figure 12:
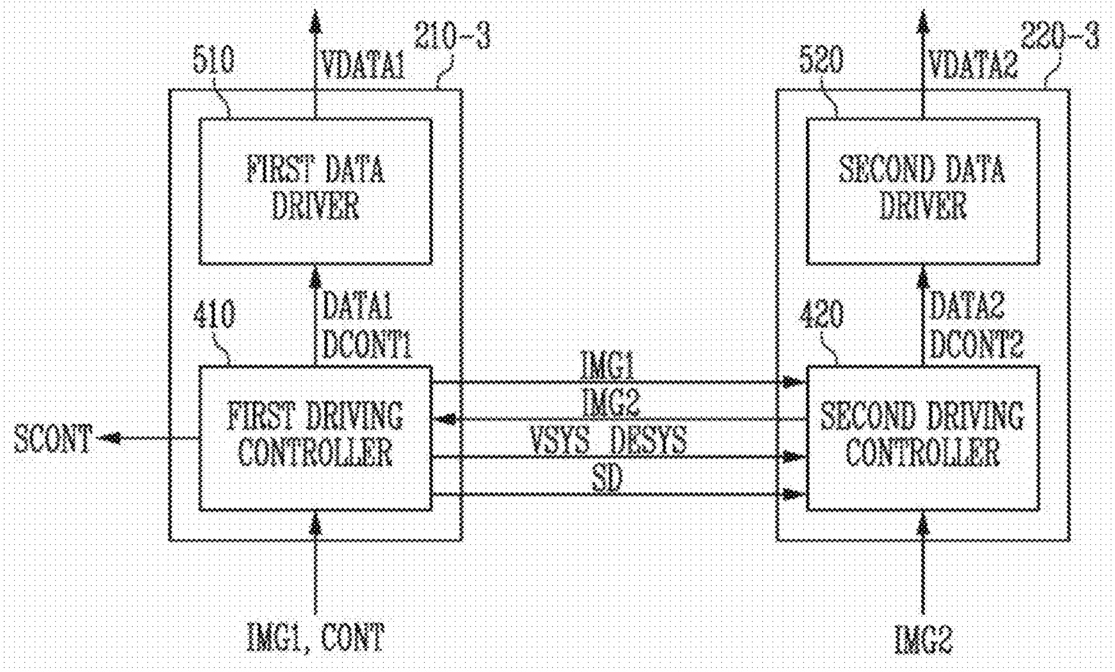
FIG. 12 is a block diagram illustrating first and second display panel drivers of the display device according to embodiments of the present invention.
Figure 13:
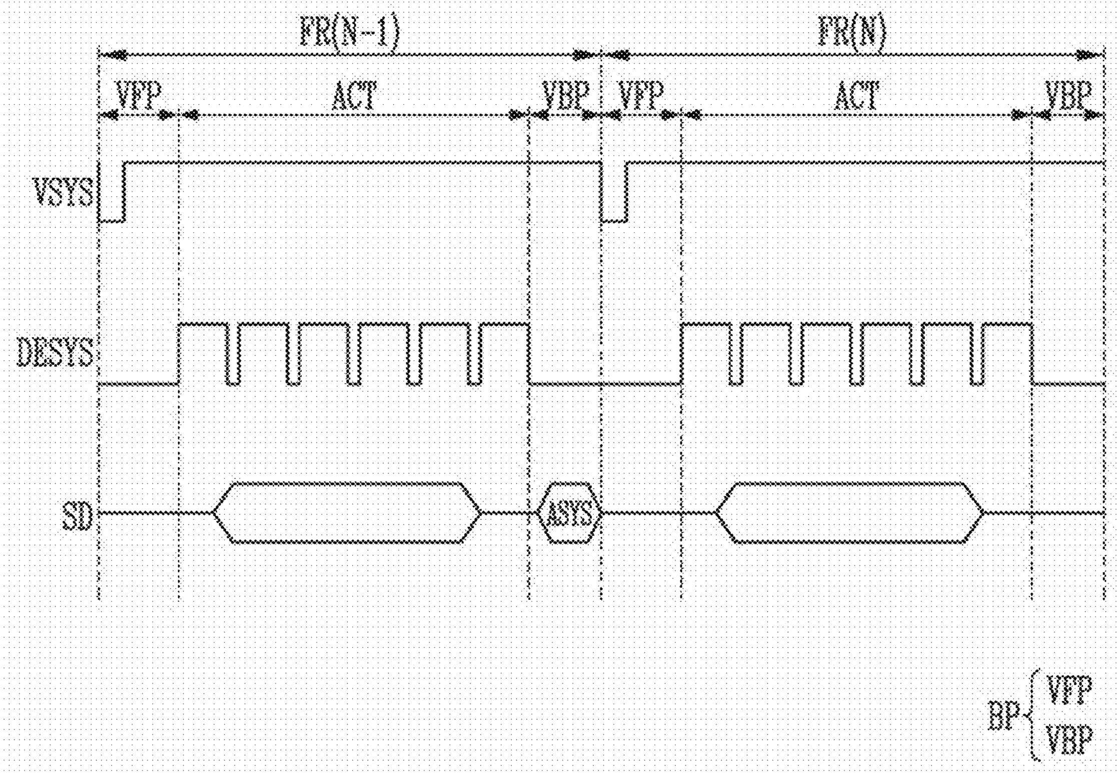
FIG. 13 is a diagram illustrating an example of a vertical synchronization signal, a data enable synchronization signal, and a shared signal of FIG. 12.

FIG. 12 is a block diagram illustrating first and second display panel drivers of the display device according to embodiments of the present invention. FIG. 13 is a diagram illustrating an example of a vertical synchronization signal, a data enable synchronization signal, and a shared signal of FIG. 12.

Display panel drivers 210-3 and 220-3 according to embodiments of the present invention may have substantially the same configuration as the display panel drivers 210-1 and 220-1 of FIG. 2, except for shared data SD. Therefore, the same reference numbers and symbols will be used for the same or similar components or elements, and overlapping descriptions will be omitted or briefly discussed.

Referring to FIGS. 1, 12, and 13, a first display panel driver 210-3 may provide the shared data SD to a second display panel driver 220-3. The shared data SD may be data that needs to be shared between the first and second display panel drivers 210-3 and 220-3.

In one embodiment of the present invention, the shared data SD may be data related to global compensation. In a case of global compensation, which is compensation for the entire display area DA, compensation for the first area DA1 and the second area DA2 cannot be performed separately from each other. Therefore, it is desirable for the first and second display panel drivers 210-3 and 220-3 to share information regarding compensation and the like.

However, the shared data SD according to the present embodiment is not limited to data related to global compensation, and any data shared between the first and second display panel drivers 210-3 and 220-3 may be sufficient.

For example, the accumulation synchronization signal ASYS may be included in the shared data SD; however, the present invention is not limited thereto. Like the data enable synchronization signal DESYS, the shared data SD might not be transmitted throughout one frame. In this case, the accumulation synchronization signal ASYS may be transmitted in a section where the shared data SD is not transmitted. In the present embodiment, a case where the accumulation synchronization signal ASYS is included in the back porch section VBP is described as an example. However, the present invention is not limited thereto, and any section in which the shared data SD is not transmitted may be sufficient.

Figure 14:
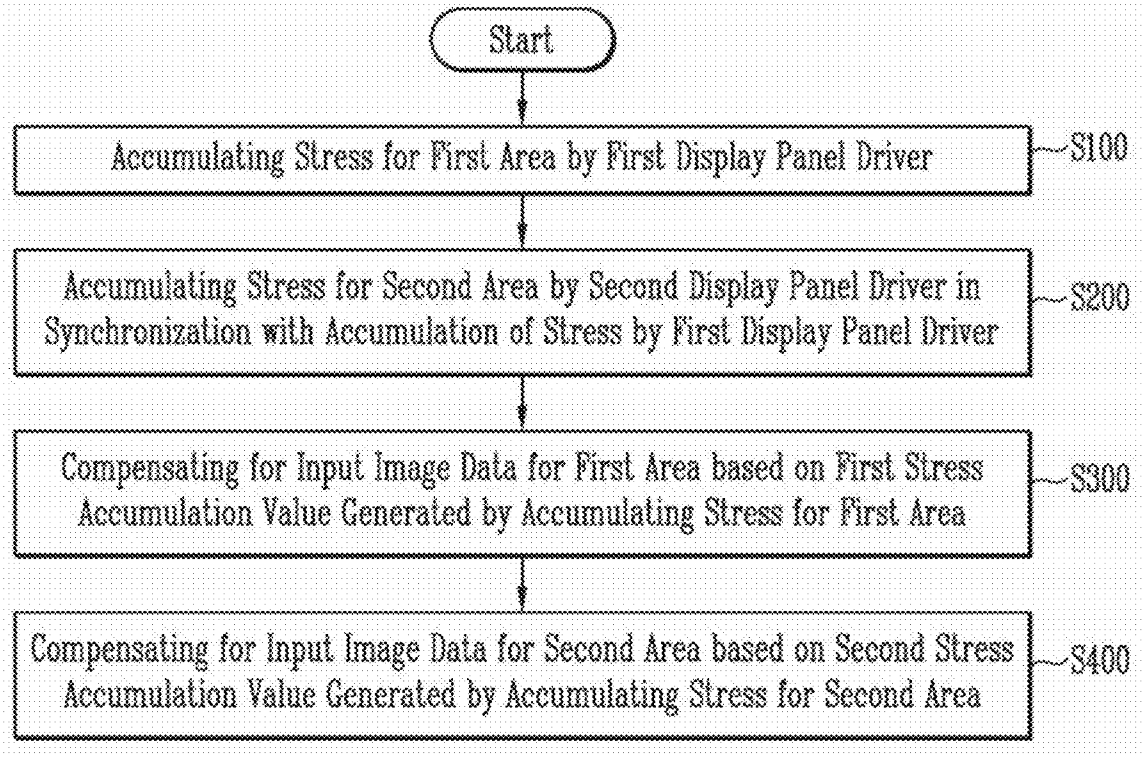
FIG. 14 is a flowchart illustrating a method of driving a display device according to embodiments of the present invention.

FIG. 14 is a flowchart illustrating a method of driving a display device according to embodiments of the present invention.

Referring to FIG. 14, a method of driving a display device according to embodiments of the present invention may include the following: accumulating stress for a first area by a first display panel driver (S100); accumulating stress for a second area by a second display panel driver in synchronization with the accumulation of stress by the first display panel driver (S200); compensating for input image data for the first area based on a first stress accumulation value generated by accumulating the stress for the first area (S300); and compensating for input image data for the second area based on a second stress accumulation value generated by accumulating the stress for the second area (S400). However, steps S100 and S200 do not necessarily have to be performed sequentially, but steps S100 and S200 may be performed simultaneously. Likewise, steps S300 and S400 do not necessarily have to be performed sequentially, but steps S300 and S400 may be performed simultaneously.

Since steps S100 to S400 have been described with reference to FIGS. 1 to 13, redundant description will be omitted.

Figure 15:
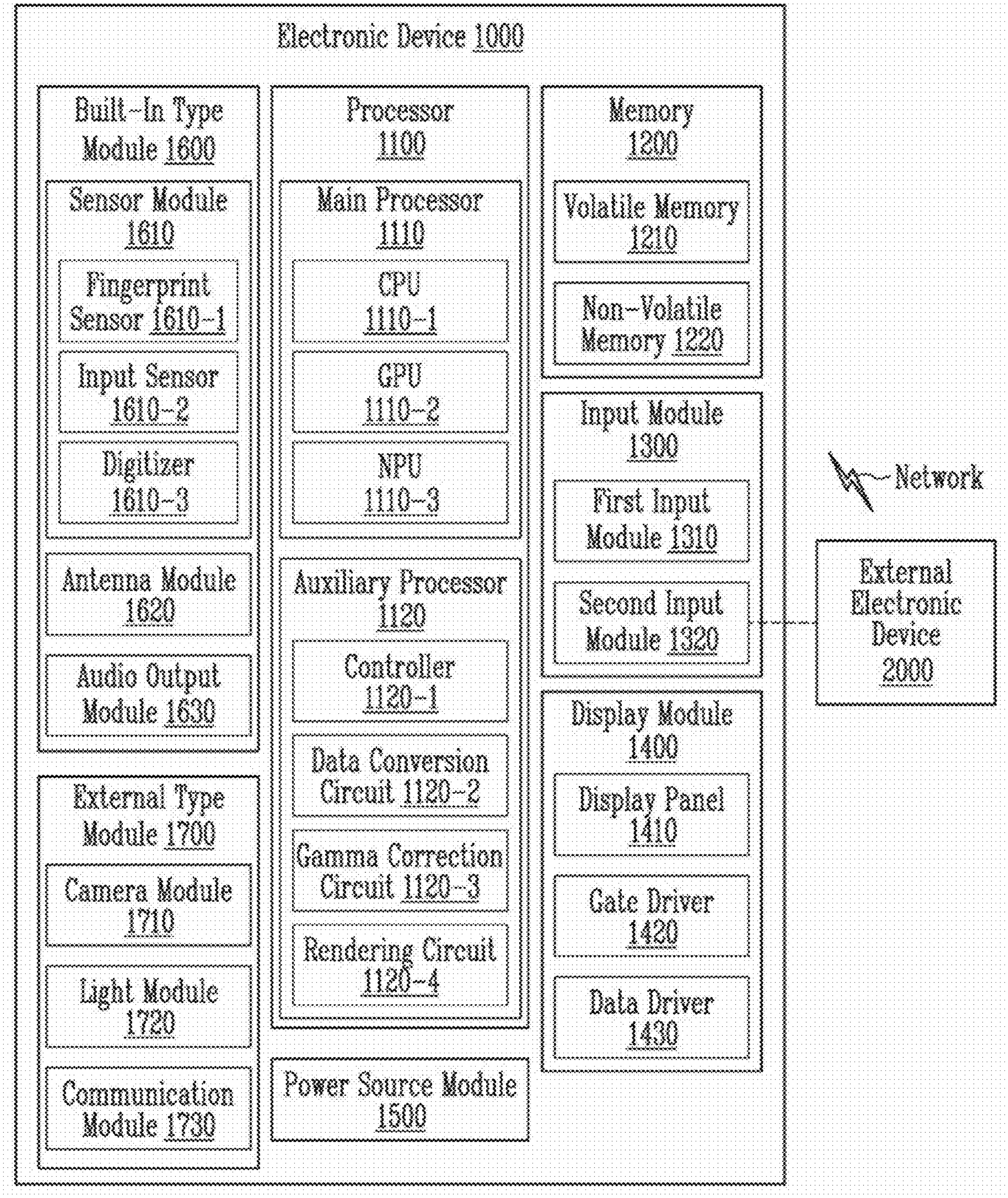
FIG. 15 is a block diagram illustrating an electronic device according to embodiments of the present invention.

FIG. 15 is a block diagram illustrating an electronic device according to embodiments of the present invention.

Referring to FIG. 15, an electronic device 1000 may output various information through a display module 1400 within an operating system. When a processor 1100 executes an application that is stored in a memory 1200, the display module 1400 may provide application information to a user through a display panel 1410. In this case, the display panel 1410 may be the display panel of FIG. 1.

In one embodiment of the present invention, the electronic device 1000 may be implemented as a smartphone. However, this is only an example, and the electronic device 1000 is not limited thereto. For example, the electronic device 1000 may also be implemented as a mobile phone, a video phone, a smart pad, a smart watch, a tablet PC, a car navigation system, a computer monitor, a laptop, a head-mounted display device, or the like.

The processor 1100 may obtain an external input through an input module 1300 or a sensor module 1610 and execute an application corresponding to the external input. In one embodiment of the present invention, when the user selects a camera icon that is displayed on the display panel 1410, the processor 1100 may obtain a user input through an input sensor 1610-2 and activate a camera module 1710 based on the user input. The processor 1100 may transmit a data signal corresponding to the captured image obtained through the camera module 1710 to the display module 1400. The display module 1400 may display an image corresponding to the captured image through the display panel 1410.

In an embodiment of the present invention, when personal information authentication is performed in the display module 1400, a fingerprint sensor 1610-1 may obtain input fingerprint information as input data. The processor 1100 may compare the input data obtained through the fingerprint sensor 1610-1 with authentication data that is stored in the memory 1200, and execute an application according to the comparison result. The display module 1400 may display information executed according to the logic of the application through the display panel 1410.

In an embodiment of the present invention, when a music streaming icon, which is displayed on the display module 1400, is selected through a user input, the processor 1100 may obtain the user input through the input sensor 1610-2 and activate a music streaming application that is stored in the memory 1200. When a music play command is input from the music streaming application, the processor 1100 may activate an audio output module 1630 to provide audio information corresponding to the music play command to the user.

In the above, the operation of the electronic device 1000 is briefly described. Below, the configuration of the electronic device 1000 will be described in detail. Some of components of the electronic device 1000, which will be described later, may be integrated and provided as one component, or one component may be divided into two or more components.

The electronic device 1000 may communicate with an external electronic device 2000 through a network (for example, a short-range wireless communication network or a long-range wireless communication network). According to one embodiment of the present invention, the electronic device 1000 may include the processor 1100, the memory 1200, the input module 1300, the display module 1400, a power source module 1500, a built-in type module 1600, and an external type module 1700. According to one embodiment of the present invention, in the electronic device 1000, at least one of the components described above may be omitted, or one or more other components may be added. According to one embodiment of the present invention, some components (for example, the sensor module 1610, an antenna module 1620, or the audio output module 1630) may be integrated into one other component (for example, the display module 1400).

The processor 1100 may execute software to control at least one other component (for example, hardware or software component) of the electronic device 1000 that is connected to the processor 1100, and the processor 1100 may perform various data processing or operations. According to one embodiment of the present invention, as at least a part of the data processing or operations, the processor 1100 may store a command or data received that is from other components (for example, the input module 1300, the sensor module 1610, or a communication module 1730) in a volatile memory 1210. In addition, the processor 1100 may process the command or data that is stored in the volatile memory 1210, and may store the resulting data in a non-volatile memory 1220.

The processor 1100 may include a main processor 1110 and an auxiliary processor 1120. The main processor 1110 may include one or more of a central processing unit (CPU) 1110-1 and an application processor (AP). The main processor 1110 may further include one or more of a graphics processing unit (GPU) 1110-2, a communication processor (CP), and/or an image signal processor (ISP). The main processor 1110 may further include a neural network processing unit (NPU) 1110-3. The neural network processing unit may be a processor that is specialized in processing artificial intelligence models, and the artificial intelligence models may be created through machine learning. An artificial intelligence model may include multiple artificial neural network layers. For example, an artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks or a combination of two or more of the above, but the present invention is not limited to the examples described above. In addition to a hardware structure, the artificial intelligence model may additionally or alternatively include a software structure. At least two of the above-described processing unit and processor may be implemented as an integrated component (for example, a single chip), or may be implemented as independent components (for example, a plurality of chips).

The auxiliary processor 1120 may include a controller 1120-1. For example, the controller 1120-1 may include an interface conversion circuit and a timing control circuit. The controller 1120-1 may receive input image data from the main processor 1110, and may convert the data format of the input image data to match the interface specifications with the display module 1400. output a data signal. The controller 1120-1 may output various control signals for driving the display module 1400.

The auxiliary processor 1120 may further include a data conversion circuit 1120-2, a gamma correction circuit 1120-3, a rendering circuit 1120-4, and the like. The data conversion circuit 1120-2 may receive the data signal from the controller 1120-1, compensate for the data signal to display an image at a desired luminance according to the characteristics of the electronic device 1000 or user's settings, or convert the data signal to reduce power consumption or compensate for an afterimage. The gamma correction circuit 1120-3 may convert the data signal or a gamma reference voltage so that an image that is displayed on the electronic device 1000 has desired gamma characteristics. The rendering circuit 1120-4 may receive the data signal from the controller 1120-1 and render the data signal by considering a pixel arrangement of the display panel 1410 that is applied to the electronic device 1000 and the like. At least one of the data conversion circuit 1120-2, the gamma correction circuit 1120-3, or the rendering circuit 1120-4 may be integrated into another component (for example, the main processor 1110 or the controller 1120-1).

At least one of the controller 1120-1, the data conversion circuit 1120-2, the gamma correction circuit 1120-3, or the rendering circuit 1120-4 may be integrated into a data driver 1430, which will be described later.

In this case, the auxiliary processor 1120 may be the driving controller of FIG. 2.

The memory 1200 may store various data that is used by at least one component (for example, the processor 1100 or the sensor module 1610) of the electronic device 1000 and may store input data or output data for the command related thereto. The memory 1200 may include at least one of the volatile memory 1210 or the non-volatile memory 1220.

The input module 1300 may receive the command or data to be used in components of the electronic device 1000 (for example, the processor 1100, the sensor module 1610, or the audio output module 1630) from outside the electronic device 1000 (for example, the user or the external electronic device 2000).

The input module 1300 may include a first input module 1310 through which the command or data is input from the user, and a second input module 1320 through which the command or data is input from the external electronic device 2000. The first input module 1310 may include, for example, a microphone, a mouse, a keyboard, keys (for example, buttons), or a pen (for example, a passive pen or an active pen). The second input module 1320 may support a designated protocol that can be connected through a wired connection or a wireless connection to the external electronic device 2000. According to one embodiment of the present invention, the second input module 1320 may include a high definition multimedia interface (HDMI), a universal serial bus (USB) interface, an SD card interface, or an audio interface. The second input module 1320 may include a connector that can be physically connected to the external electronic device 2000. The connector may include, for example, an HDMI connector, a USB connector, an SD card connector, or an audio connector (for example, a headphone connector).

The display module 1400 may visually provide information to the user. The display module 1400 may include the display panel 1410, a gate driver 1420, and the data driver 1430. For example, the display module 1400 may further include a window, a chassis, and a bracket to protect the display panel 1410. In this case, the gate driver 1420 and the data driver 1430 may be the gate driver of FIG. 1 and the data driver of FIG. 2.

The display panel 1410 may include, for example, a liquid crystal display panel, an organic light emitting display panel, or an inorganic light emitting display panel, and the type of the display panel 1410 is not particularly limited thereto. The display panel 1410 may be a rigid type or a flexible type capable of, for example, rolling, folding, or bending. For example, the display module 1400 may further include a supporter, which supports the display panel 1410, a bracket, and/or a heat dissipation member.

The gate driver 1420 may be mounted on the display panel 1410 as a driving chip. In addition, the gate driver 1420 may be integrated into the display panel 1410. For example, the gate driver 1420 may include an amorphous silicon TFT gate driver circuit (ASG), a low temperature polycrystaline silicon TFT gate driver circuit (LTPS), or an oxide semiconductor TFT gate driver circuit (OSG) built into the display panel 1410. The gate driver 1420 may receive a control signal from the controller 1120-1 and output gate signals to the display panel 1410 in response to the control signal.

The display panel 1410 may further include an emission driver. The emission driver may output an emission signal to the display panel 1410 in response to a control signal that is received from the controller 1120-1. The emission driver may be formed separately from the gate driver 1420 or may be integrated into the gate driver 1420.

The data driver 1430 may receive a control signal from the controller 1120-1, and may convert the data signal into an analog voltage (for example, a data voltage) in response to the control signal. The data driver 1430 may then output data voltages to the display panel 1410.

The data driver 1430 may be integrated into other components (for example, the controller 1120-1). Functions of the interface conversion circuit and timing control circuit of the controller 1120-1 described above may be integrated into the data driver 1430.

The display module 1400 may further include a power source voltage generator circuit and the like. A power source voltage generator circuit may output various voltages for driving the display panel 1410.

The power source module 1500 may supply power to components of the electronic device 1000. The power source module 1500 may include a battery that charges a power source voltage. For example, the battery may include a non-rechargeable primary cell, a rechargeable secondary cell, or a fuel cell. For example, the power source module 1500 may include a power management integrated circuit (PMIC). The PMIC may supply optimized power source to each of the modules described above and the modules described below. The power source module 1500 may include a wireless power transmission/reception member electrically connected to the battery. The wireless power transmission/reception member may include a plurality of coil-shaped antenna radiators.

The electronic device 1000 may further include a built-in type module 1600 and an external type module 1700. The built-in type module 1600 may include the sensor module 1610, the antenna module 1620, and the audio output module 1630. The external type module 1700 may include the camera module 1710, a light module 1720, and the communication module 1730.

The sensor module 1610 may detect an input by the user's body or an input by the pen of the first input module 1310, and generate an electrical signal or a data value corresponding to the input. The sensor module 1610 may include at least one of, for example, the fingerprint sensor 1610-1, the input sensor 1610-2, or a digitizer 1610-3.

The fingerprint sensor 1610-1 may generate a data value corresponding to the user's fingerprint. The fingerprint sensor 1610-1 may include any one of an optical or capacitive fingerprint sensor.

The input sensor 1610-2 may generate a data value corresponding to coordinate information of the input by the user's body or the input by the pen. The input sensor 1610-2 may generate the data value by detecting the amount of change in capacitance caused by the input. The input sensor 1610-2 may detect an input by a passive pen or may transmit and receive data with an active pen.

The input sensor 1610-2 may also measure a bio-signal such as blood pressure, moisture, or body fat. For example, when a part of the body of the user touches a sensor layer or a sensing panel and does not move for a certain period of time, the input sensor 1610-2 may detect a bio-signal based on a change in an electric field caused by the part of the body, and may output information that is desired by the user to the display module 1400.

The digitizer 1610-3 may generate a data value corresponding to coordinate information of the input by the pen. The digitizer 1610-3 may generate the data value by detecting the amount of change in electromagnetic field caused by the input. The digitizer 1610-3 may detect input by a passive pen or transmit and receive data with an active pen.

At least one of the fingerprint sensor 1610-1, the input sensor 1610-2, or the digitizer 1610-3 may be implemented as a sensor layer that is formed on the display panel 1410 through a continuous process. The fingerprint sensor 1610-1, the input sensor 1610-2, and the digitizer 1610-3 may be disposed on an upper side of the display panel 1410, and any one of the fingerprint sensor 1610-1, the input sensor 1610-2, or the digitizer 1610-3 may be disposed on a lower side of the display panel 1410.

At least two of the fingerprint sensor 1610-1, the input sensor 1610-2, or the digitizer 1610-3 may be formed to be integrated into one sensing panel through the same process. When integrated into one sensing panel, the sensing panel may be disposed between the display panel 1410 and a window that is disposed on the top of the display panel 1410. According to one embodiment of the present invention, the sensing panel may be disposed on the window, and the position of the sensing panel is not particularly limited thereto.

At least one of the fingerprint sensor 1610-1, the input sensor 1610-2, or the digitizer 1610-3 may be built into the display panel 1410. For example, at least one of the fingerprint sensor 1610-1, the input sensor 1610-2, or the digitizer 1610-3 may be formed simultaneously through a process of forming elements (for example, a light emitting element, a transistors, and the like) included in the display panel 1410.

In addition, the sensor module 1610 may generate an electrical signal or a data value corresponding to the internal or external state of the electronic device 1000. The sensor module 1610 may further include, for example, a gesture sensor, a gyro sensor, a barometric pressure sensor, a magnetic sensor, an acceleration sensor, a grip sensor, a proximity sensor, a color sensor, an IR (infrared) sensor, a biometric sensor, a temperature sensor, a humidity sensor, or an illumination sensor.

The antenna module 1620 may include one or more antennas for transmitting or receiving a signal or power to/from the outside. According to one embodiment of the present invention, the communication module 1730 may transmit a signal to or receive a signal from an external electronic device through an antenna that is suitable for a communication method. An antenna pattern of the antenna module 1620 may be integrated into one component of the display module 1400 (for example, the display panel 1410), the input sensor 1610-2, or the like.

The audio output module 1630 may be a device for outputting an audio signal to the outside of the electronic device 1000, and may include, for example, a speaker that is used for general purposes such as multimedia playback or recording playback, and a receiver that is used exclusively for receiving phone call. According to one embodiment of the present invention, the receiver may be formed integrally with the speaker or may be formed separately. An audio output pattern of the audio output module 1630 may be integrated into the display module 1400.

The camera module 1710 may capture a still image and a moving image. According to one embodiment of the present invention, the camera module 1710 may include one or more lenses, an image sensor, or an image signal processor. The camera module 1710 may further include an infrared camera that is capable of measuring the presence or absence of the user, the user's location, the user's gaze, and the like.

The light module 1720 may provide light. The light module 1720 may include a light emitting diode or a xenon lamp. The light module 1720 may operate in conjunction with the camera module 1710 or operate independently.

The communication module 1730 may support the establishment of a wired or wireless communication channel between the electronic device 1000 and the external electronic device 2000, and the performance of communication through the established communication channel. The communication module 1730 may include one or both of a wireless communication module such as a cellular communication module, a short-range wireless communication module, or a global navigation satellite system (GNSS) communication module, and a wired communication module such as a local area network (LAN) communication module or a power line communication module. The communication module 1730 may communicate with the external electronic device 2000 through a short-range communication network such as Bluetooth, WiFi direct, or infrared data association (IrDA), or a long-range communication network such as a cellular network, the Internet, or a computer network (for example, a LAN or WAN). The various types of communication modules 1730 described above may be implemented as one chip or may be implemented as separate chips.

The input module 1300, the sensor module 1610, the camera module 1710, and the like may be used to control the operation of the display module 1400 in conjunction with the processor 1100.

The processor 1100 may output the command or data to the display module 1400, the audio output module 1630, the camera module 1710, or the light module 1720 based on the input data that is received from the input module 1300. For example, the processor 1100 may generate the data signal in response to the input data that is applied through a mouse or an active pen and may output the data signal to the display module 1400, or may generate command data in response to the input data and may output the command data to the camera module 1710 or light module 1720. When the input data is not received from the input module 1300 for a predetermined period of time, the processor 1100 may change the operation mode of the electronic device 1000 to a low power mode or sleep mode to reduce power consumption by the electronic device 1000.

The processor 1100 may output the command or data to the display module 1400, the audio output module 1630, the camera module 1710, or the light module 1720 based on sensing data that is received from the sensor module 1610. For example, the processor 1100 may compare authentication data that is collected by the fingerprint sensor 1610-1 with the authentication data that is stored in the memory 1200, and then the processor 1100 may execute an application according to the comparison result. The processor 1100 may execute a command or output a corresponding data signal to the display module 1400 based on sensing data that is detected by the input sensor 1610-2 or the digitizer 1610-3. When the sensor module 1610 includes a temperature sensor, the processor 1100 may receive temperature data about the temperature measured from the sensor module 1610 and may perform luminance correction on the data signal based on the temperature data.

The processor 1100 may receive measurement data about the presence or absence of the user, the user's location, the user's gaze, and the like from the camera module 1710. The processor 1100 may further perform luminance correction on the data signal based on the measurement data. For example, the processor 1100, which determines the presence or absence of the user through input from the camera module 1710, may output the data signal whose luminance has been corrected by the data conversion circuit 1120-2 or the gamma correction circuit 1120-3 to the display module 1400.

Some of the components described above may be connected to each other through a communication method between peripheral devices, for example, a bus, a general purpose input/output (GPIO), a serial peripheral interface (SPI), a mobile industry processor interface (MIPI), or an ultra path interconnect (UPI) link to exchange a signal (for example, the command or data) with each other. The processor 1100 may communicate with the display module 1400 through a mutually agreed upon interface. For example, any one of the above-described communication methods may be used, and might not be limited to the above-described communication methods.

In the display device according to embodiments of the present invention, display panel drivers may be synchronized with each other through the accumulation synchronization signal to accumulate stress.

In the display device according to embodiments of the present invention, as the display panel drivers accumulate stress in each frame, the display panel drivers may be synchronized with each other to accumulate stress.

In the display device according to embodiments of the present invention, as the display panel drivers are synchronized with each other to accumulate stress, the boundary compensation deviation that is caused by the display panel drivers accumulating stress of different frames can be improved and visibility can be increased.

However, effects of the present invention are not limited to the above-described effects, and embodiments of the present invention may include various other effects without departing from the spirit and scope of the present invention.

Although embodiments and applications have been described herein, they are provided only to aid the overall understanding of the invention. The present invention is not limited to the above-described embodiments, and various modifications and changes can be made by those skilled in the art from the foregoing descriptions without departing from the spirit and scope of the present invention.

Therefore, the spirit and scope of the present invention should not be limited to the above-described embodiments.

Embodiments of the present invention may be applied to a display device and an electronic device including the same. For example, embodiments of the present invention may be applied to digital TV, 3D TV, a mobile phone, a smart phone, a tablet computer, a VR device, a PC, a home electronic device, a laptop computer, a PDA, a PMP, a digital camera, a music player, a portable game console, a navigation system, or the like.

While the present invention has been particularly shown and described with reference to embodiments thereof, it will be apparent those of ordinary skill in the art that various changes in form and detail may be made thereto without departing from spirit and scope of the present invention.

What is claimed is:

1. An electronic device comprising:

a display device comprising:

a display panel including sub-pixels, a first area, and a second area, wherein the sub-pixels are disposed in the first area and the second area;

a first display panel driver configured to drive the first area, to accumulate stress for the first area to generate a first stress accumulation value, and to compensate for input image data that is for the first area based on the first stress accumulation value; and a second display panel driver configured to drive the second area, to accumulate stress for the second area to generate a second stress accumulation value, and to compensate for input image data that is for the second area based on the second stress accumulation value, wherein the first display panel driver and the second display panel driver are synchronized with each other through an accumulation synchronization signal, and wherein the first display panel driver provides the accumulation synchronization signal to the second display panel driver.

2. The electronic device of claim 1, further comprising:

a gate driver configured to provide gate signals to the sub-pixels, wherein the first display panel driver controls the gate driver.

3. The electronic device of claim 1, wherein the first display panel driver provides a data enable synchronization signal, which has an activation level, to the second display panel driver during an active section, and wherein the accumulation synchronization signal is included in the data enable synchronization signal.

4. The electronic device of claim 3, wherein the accumulation synchronization signal is included in the data enable synchronization signal during a blank section.

5. The electronic device of claim 1, wherein the second display panel driver receives the accumulation synchronization signal, which has an activation level, to accumulate the stress.

6. The electronic device of claim 5, wherein when the first display panel driver accumulates the stress for the first area in an N-th frame, the accumulation synchronization signal has the activation level in a front porch section of the N-th frame, wherein N is a positive integer.

7. The electronic device of claim 5, wherein when the first display panel driver accumulates the stress for the first area in an N-th frame, the accumulation synchronization signal has the activation level in a back porch section of an (N−1)th frame, wherein N is a positive integer greater than or equal to 2.

8. The electronic device of claim 1, wherein the first display panel driver provides shared data to the second display panel driver, and wherein the accumulation synchronization signal is included in the shared data.

9. The electronic device of claim 8, wherein the accumulation synchronization signal is included in the shared data during a section in which the shared data is not transmitted.

10. The electronic device of claim 8, wherein the shared data is data that is related to global compensation of the display panel.

11. The electronic device of claim 1, wherein the first display panel driver and the second display panel driver accumulate the stress in each frame at a predetermined cycle.

12. The electronic device of claim 1, wherein the first display panel driver and the second display panel driver accumulate the stress in a frame that is randomly determined within one frame group that includes K frames, wherein K is a positive integer greater than or equal to 2.

13. A display device comprising:

a display panel including sub-pixels, a first area, a second area, wherein the sub-pixels are disposed in the first area and the second area;

a first display panel driver configured to drive the first area, to accumulate stress for the first area to generate a first stress accumulation value, and to compensate for input image data that is for the first area based on the first stress accumulation value; and a second display panel driver configured to drive the second area, to accumulate stress for the second area to generate a second stress accumulation value, and to compensate for input image data that is for the second area based on the second stress accumulation value, wherein the first display panel driver and the second display panel driver are synchronized with each other through an accumulation synchronization signal, and each of the first display panel driver and the second display panel driver accumulate the stress in each frame at a predetermined cycle.

14. The display device of claim 13, further comprising:

a gate driver configured to provide gate signals to the sub-pixels, wherein the first display panel driver controls the gate driver.

15. A method of driving a display device including a first display panel driver, which is configured to drive a first area of a display panel, and a second display panel driver, which is configured to drive a second area of the display panel, the method comprising:

accumulating first stress data based on grayscales for subpixels in the first area by the first display panel driver;

accumulating second stress data based on grayscales for subpixels for the second area by the second display panel driver in synchronization with the accumulation of the first stress data;

compensating for input image data for the first area based on a first stress accumulation value that is generated by accumulating the first stress data of the first area; and compensating for input image data for the second area based on a second stress accumulation value that is generated by accumulating the second stress data of the second area.

16. The method of claim 15, wherein the first display panel driver provides an accumulation synchronization signal to the second display panel driver, and wherein the second display panel driver is synchronized with the accumulation of the first stress data by the first display panel driver through the accumulation synchronization signal.

17. The method of claim 16, wherein the first display panel driver provides a data enable synchronization signal, which has an activation level, to the second display panel driver during an active section, and wherein the accumulation synchronization signal is included in the data enable synchronization signal.

18. The method of claim 16, wherein the first display panel driver provides shared data to the second display panel driver, and wherein the accumulation synchronization signal is included in the shared data.

19. The method of claim 15, wherein the accumulation of the first stress data of the first area by the first display panel driver and the accumulation of the second stress data of the second area by the second display panel driver occurs in each frame at a predetermined cycle.

* * * * *